Figure 1:
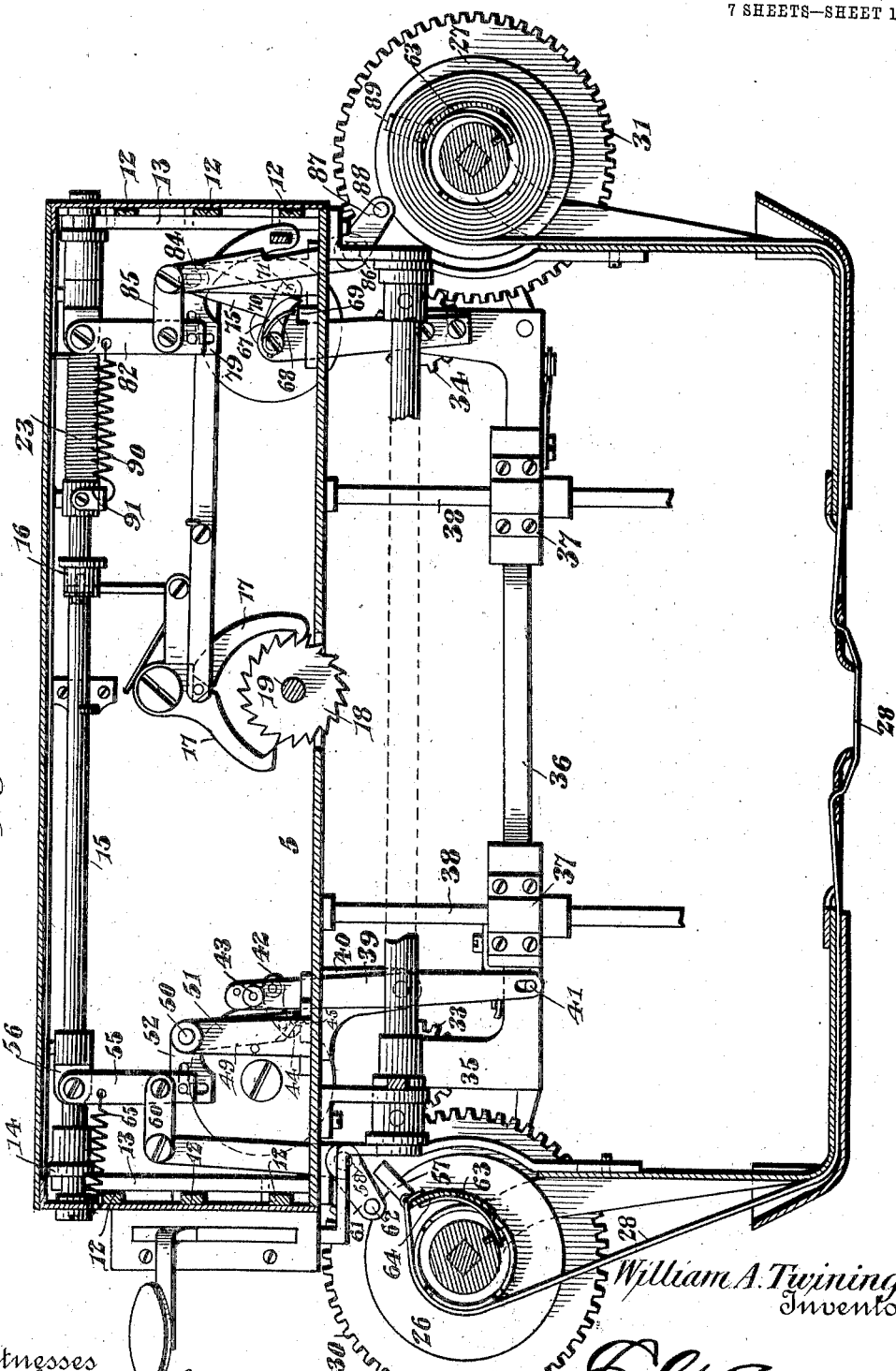

No. 820,834. PATENTED MAY 15, 1906.
W. A. TWINING.
AUTOMATIC RIBBON REVERSE.
APPLICATION FILED MAR. 14, 1905.

7 SHEETS—SHEET 1.

Witnesses
Jas. K. McCathran
Louis S. Julihn

William A. Twining,
Inventor

By C. G. Siggers
Attorney

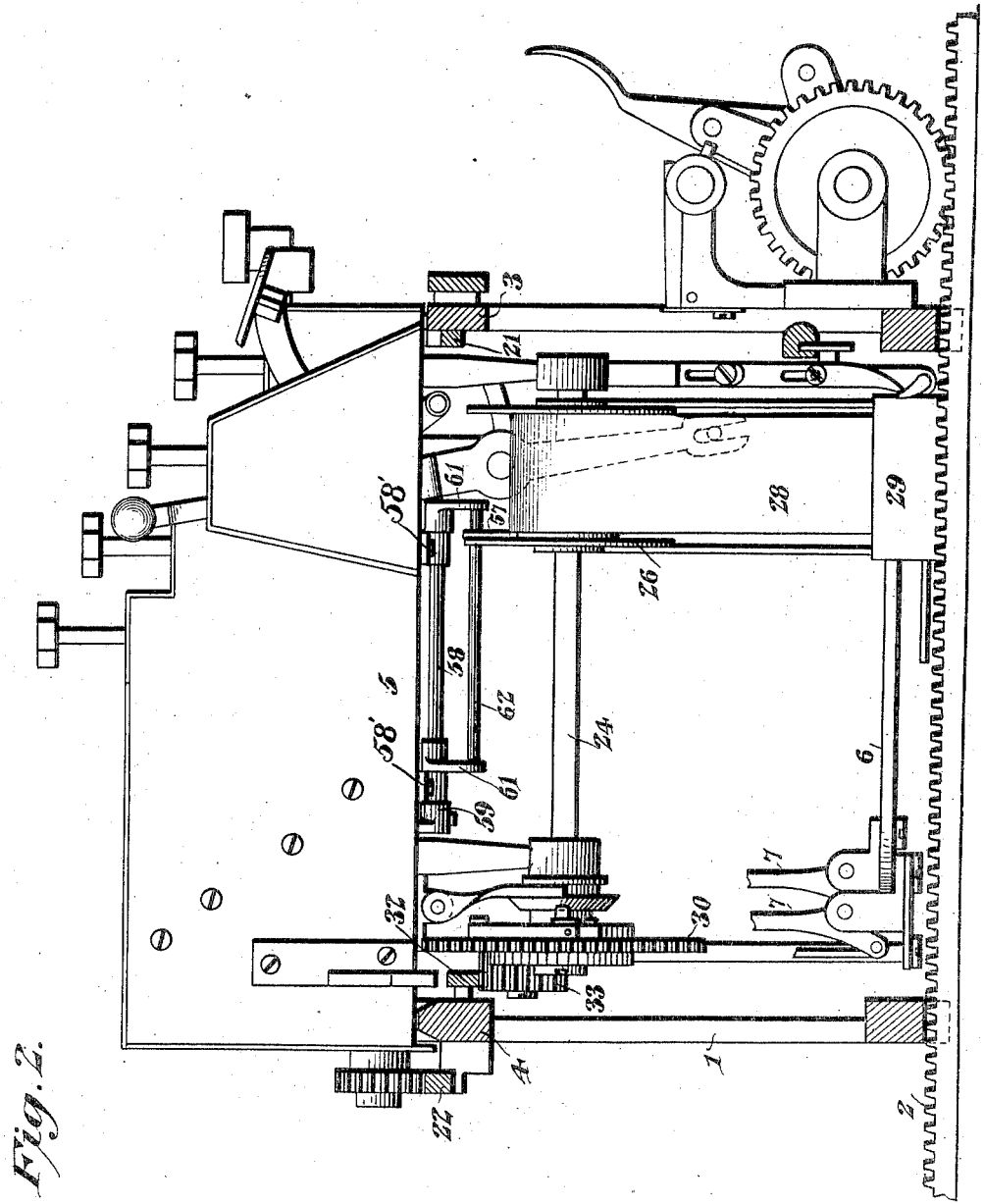

No. 820,834. PATENTED MAY 15, 1906.
W. A. TWINING.
AUTOMATIC RIBBON REVERSE.
APPLICATION FILED MAR. 14, 1905.
7 SHEETS—SHEET 3.
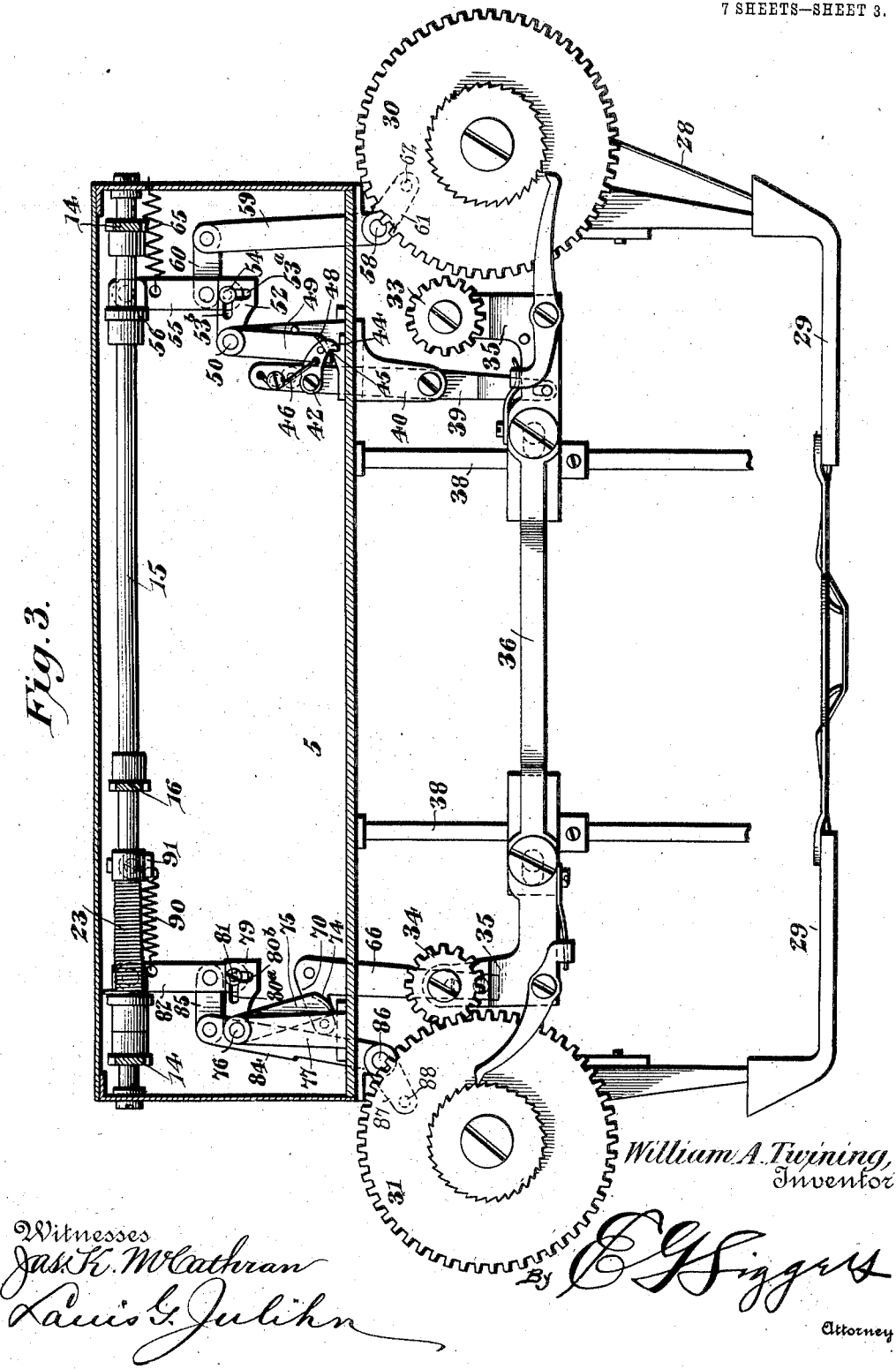
Witnesses
Jas. K. McCathran
Louis G. Julihn
William A. Twining,
Inventor
By
Attorney

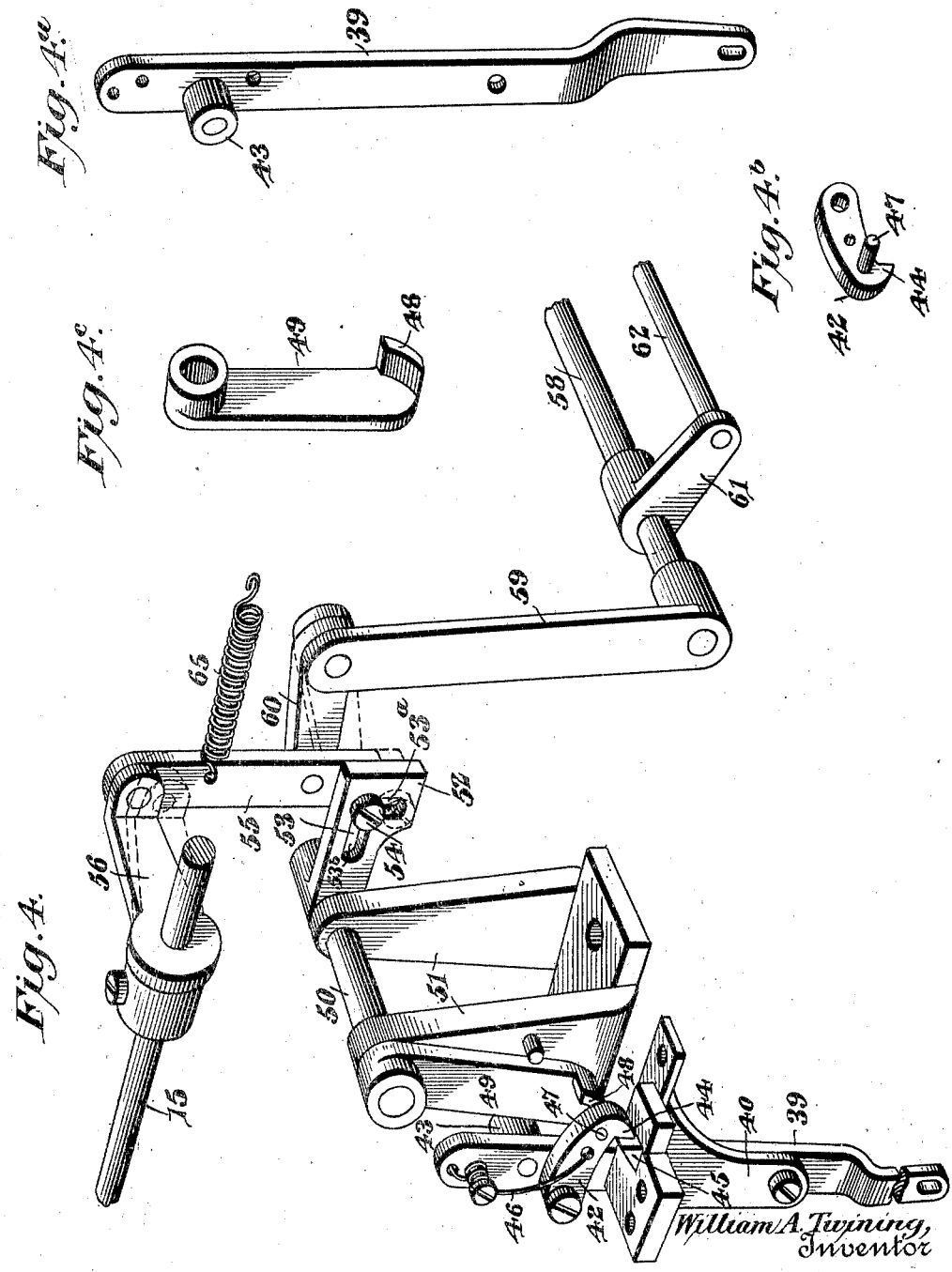

No. 820,834. PATENTED MAY 15, 1906.
W. A. TWINING.
AUTOMATIC RIBBON REVERSE.
APPLICATION FILED MAR. 14, 1905.
7 SHEETS—SHEET 5.
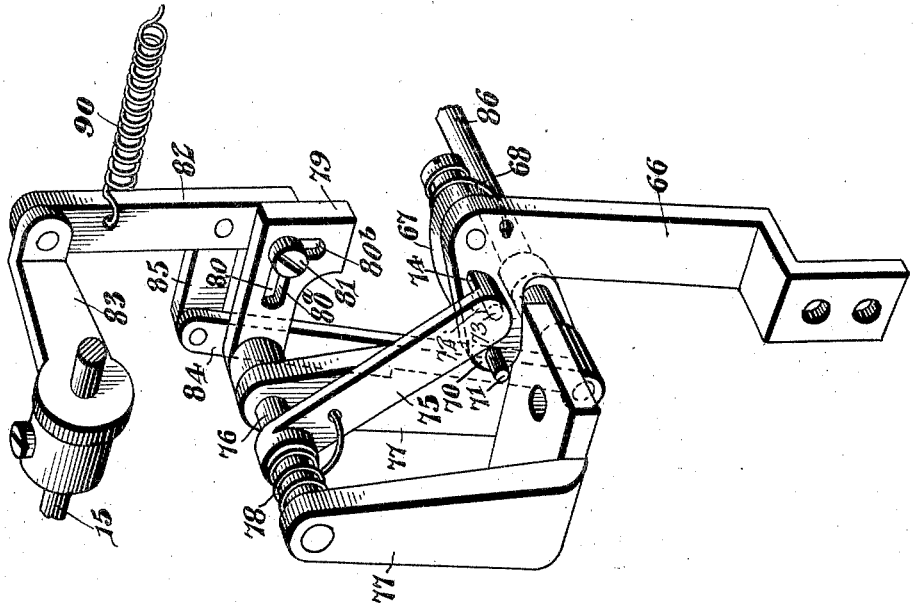
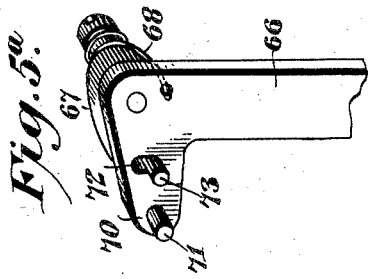
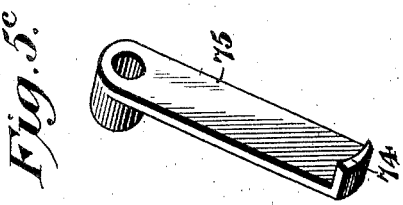
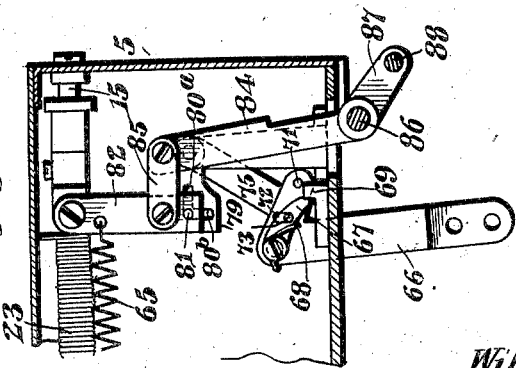
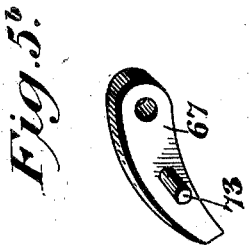
Witnesses
Jas. F. McCathran
Lewis G. Julihn
William A. Twining, Inventor
By C. G. Siggers
Attorney

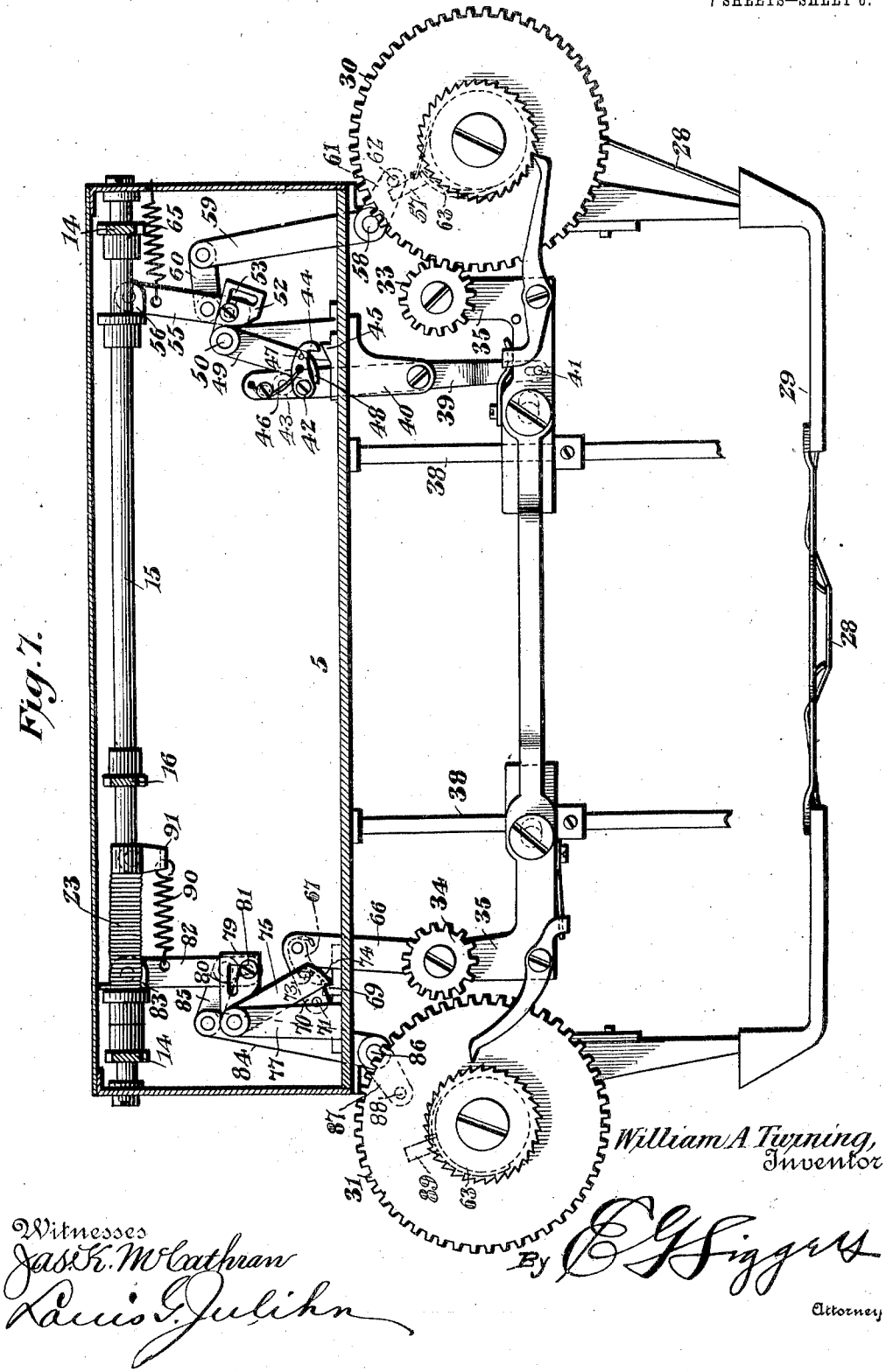

No. 820,834. PATENTED MAY 15, 1906.
W. A. TWINING.
AUTOMATIC RIBBON REVERSE.
APPLICATION FILED MAR. 14, 1905.
7 SHEETS—SHEET 7.
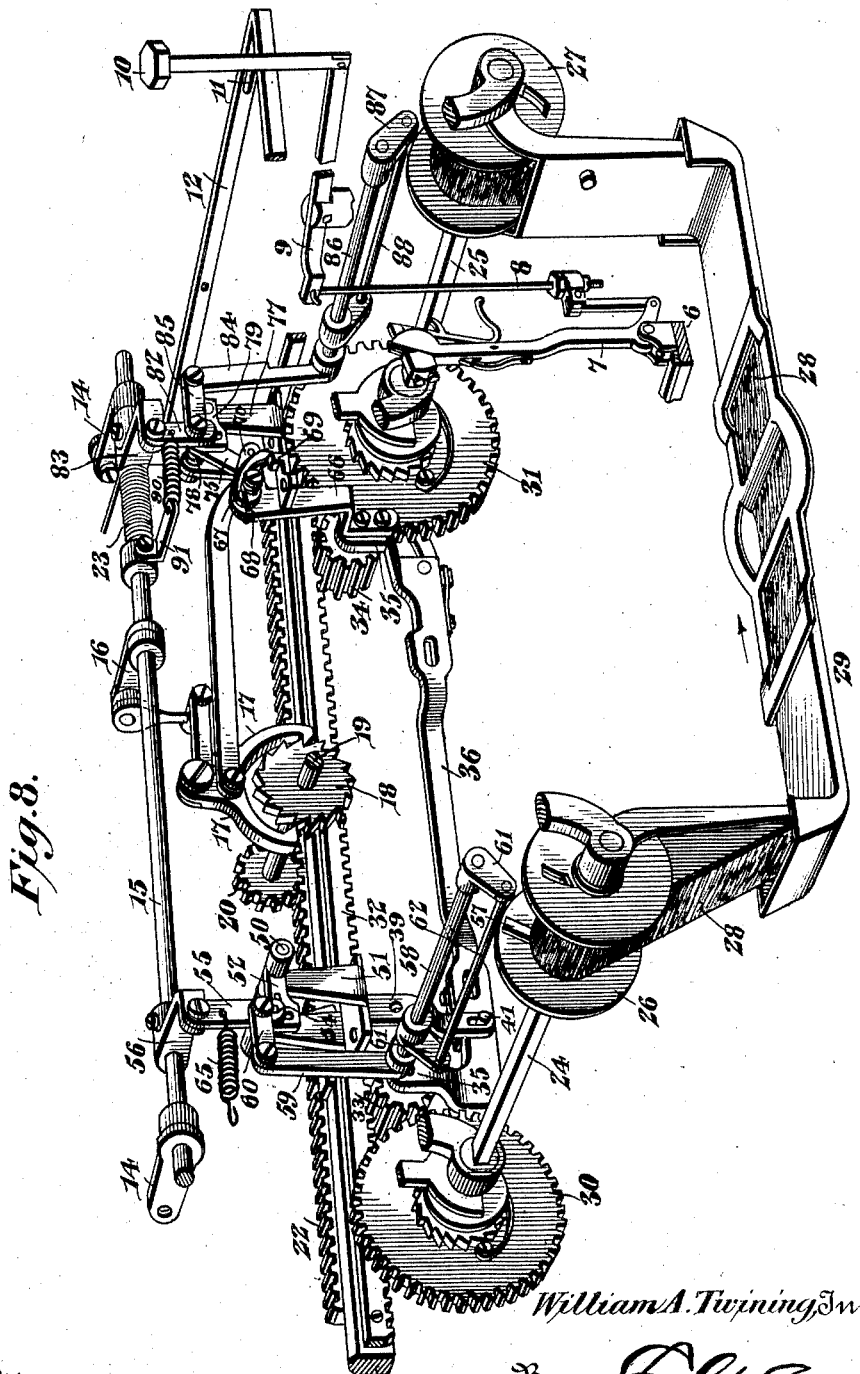
William A. Twining, Inventor
Witnesses

UNITED STATES PATENT OFFICE.

WILLIAM A. TWINING, OF CLEVELAND, OHIO, ASSIGNOR TO ELLIOTT-FISHER COMPANY, OF NEW YORK, N. Y., A CORPORATION OF DELAWARE.

AUTOMATIC RIBBON-REVERSE.

No. 820,834.   Specification of Letters Patent.   Patented May 15, 1906.

Application filed March 14, 1905. Serial No. 250,052.

*To all whom it may concern:*

Be it known that I, WILLIAM A. TWINING, a citizen of the United States, residing at Cleveland, in the county of Cuyahoga and State of Ohio, have invented a new and useful Automatic Ribbon-Reverse, of which the following is a specification.

This invention relates to novel mechanism for automatically reversing the feed of a type-writer ribbon when the latter has been completely fed in one direction.

The object of the invention is to provide an automatic ribbon-reversing mechanism adapted for the equipment of an Elliott-Fisher type-writer of the Fisher type or pattern and capable of use in connection with the ribbon-feeding mechanism invented by John A. Smith and disclosed in Patent No. 723,936, dated March 31, 1903.

The invention consists in providing locking means for the shift-bar of the Smith ribbon-feed and ribbon-controlled means acting automatically upon the completion of the ribbon-feed in one direction to so connect the shift-bar and its locking mechanism with the keys of the type-writer that the subsequent depression of a key to print a character on the work-sheet will incidentally unlock the shift-bar and shift the same to reverse the direction of the ribbon-feed, the shift-bar being automatically locked in its new position.

The invention also consists in certain details of construction and arrangement hereinafter described, illustrated in the accompanying drawings, and embraced within the scope of the appended claims.

In said drawings, Figure 1 is a sectional view of the carriage of an Elliott-Fisher typewriter equipped in accordance with my invention and viewed from the front. Fig. 2 is a side elevation of the complete typewriter with the machine-supporting frame in section. Fig. 3 is a section similar to Fig. 1, but viewed from the rear of the machine. Fig. 4 is a perspective view, on an enlarged scale, of the mechanism for unlocking and shifting the shift-bar in one direction. Fig. 4ᵃ is a detail perspective view of the shifting-lever shown in Fig. 4. Fig. 4ᵇ is a similar view of the locking-dog. Fig. 4ᶜ is a detail view of the unlocking and shifting arm. Fig. 5 is a detail perspective view of that group of mechanism which acts in alternation with the mechanism shown in Fig. 4 to move the shift-bar in the opposite direction. Fig. 5ᵃ is a detail view showing the manner in which the locking-dog shown in Fig. 5 is mounted at the upper end of the arm extending from the shift-bar. Fig. 5ᵇ is a detail view of the locking-dog detached. Fig. 5ᶜ is a similar view of the unlocking and shifting arm shown in Fig. 5. Fig. 6 is a sectional view through one end of the type-writer carriage, disclosing the mechanism shown in Fig. 5, but viewed from the opposite direction—that is to say, from the front of the machine. Fig. 7 is a sectional elevation of the type-writing-machine carriage and associated parts viewed from the rear, the parts being shown in the positions they assume immediately after the shifting of the ribbon-feed by the actuation of that group of mechanism shown in Fig. 4; and Fig. 8 is a skeleton perspective view designed to show the complete ribbon feeding and reversing mechanism, together with such other elements of the machine structure as are intimately associated with this invention.

As stated, the mechanism constituting the present embodiment of my invention has been devised with special reference to the equipment of an Elliott-Fisher type-writer of what is known as the "Fisher" type, exemplified in Patent No. 573,868 to R. J. Fisher. Therefore the accompanying drawings disclose so much of the Fisher machine as is necessary to a proper understanding of the invention. The Fisher type-writer is designed particularly for writing in books or upon loose sheets, cards, or other work elements supported in a flat spread-out condition upon the flat platen over which the printing mechanism is moved.

In its general organization the machine involves a machine-frame 1, mounted to travel in the direction of line-spacing upon tracks or guides 2 and having parallel front and rear carriage-guides 3 and 4, upon which is mounted to travel in the direction of letter-spacing the carriage 5. Pendent from the carriage 5 is a type-bar-supporting ring 6, a fragment of which is shown in Fig. 8. This ring supports the downwardly-swinging type-bars 7, connected by draw-wires 8 with the key-levers 9, suitably fulcrumed within the carriage-casing and operated by keys 10. From the stem of each key is extended a pin 11, which when the key is depressed engages and swings a key-yoke 12. (See Figs. 1 and 8.)

A yoke 12 is provided for each row of keys, and their rear ends are disposed to engage and operate a pair of vertical slides 13, connected to laterally-disposed arms 14, fixed to a rock-shaft 15. By means of an arm 16 and a suitable intermediate connection the rock-shaft 15 is connected to the escapement-dogs 17, disposed to alternately engage the escapement-wheel 18. The escapement-wheel 18 is mounted on a feed-spindle 19, journaled in the carriage and provided with front and rear feed-pinions 20, meshing with front and rear feed-racks 21 and 22, (see Fig. 2,) rigid with the front and rear carriage-guides 3 and 4. The carriage is constantly urged to the right, or in the direction of letter-spacing, by feed-drums, (not shown,) but is normally held against movement by the engagement of the parts of the escapement. When a key is depressed, it throws down a type-bar 7 to print a character and operates one of the yokes 12 to rock the shaft 15. This movement of the rock-shaft shifts the escapement-dogs, which reassume their normal positions when the key rises from its stroke, this return of the parts being assisted by a spring 23, encircling the shaft 15. As the escapement-dogs thus shift back during the retraction of the key, the carriage feeds forward the distance of one letter-space and is arrested by the escapement in position to print the next character.

The mechanism thus far described is not novel; but a general understanding of its construction and operation is essential to a proper comprehension of my invention, since the key-operated rock-shaft 15 of the carriage-feeding mechanism constitutes an element of the mechanism whereby I effect the unlocking and shifting of the Smith shift-bar to secure a reversal of the ribbon-feed. I shall now proceed with a brief description of the ribbon-feeding mechanism usually employed on the Fisher type-writer and exemplified in the Smith patent before referred to.

Supported in pendent hangers at the opposite end of the carriage 5 are a pair of parallel spool-shafts 24 and 25, carrying ribbon-spools 26 and 27. These spools are designed to rotate with the shafts. The inking-ribbon 28, having its opposite ends wound on the spools, is retained by a ribbon-guiding frame 29, arranged to present the ribbon immediately above the writing-surface. At the rear ends of the shafts 24 and 25 are mounted spool-pinions 30 and 31, operatively connected thereto by pawl-and-ratchet mechanism, so arranged that when either of the spool-pinions is positively rotated the associated spool will rotate therewith to wind up the ribbon, while the spool at the other end of the carriage will rotate idly to pay out the ribbon as it is drawn forward. Ribbon-release mechanism, which need not be described, is also associated with the pinions 30 and 31 to effect the complete disconnection of both pinions from the shafts when it is desired to discontinue the feed of the ribbon.

The means for effecting the positive rotation of the spool-pinions and for reversing the direction of the ribbon-feed by causing the positive rotation of one pinion or the other at the will of the operator includes a stationary operating-rack 32, preferably rigid with the rear carriage-guide 4. (See Fig. 8.) Constantly meshing with this rack are a pair of shift-pinions 33 and 34 of sufficient width to enable either of them to mesh with both a spool-pinion and the rack. These shift-pinions 33 and 34 are carried by arms 35 at the opposite ends of a shift-bar or shifter 36, slidably supported by a bracket 37, mounted on the rear hanger-bars 38, which support the type-ring 6. The interval between the shift-pinions 33 and 34 is such that while both are constantly in engagement with the operating-rack 32 only one of them can mesh with a spool-pinion at any time. Therefore by shifting the bar 36 one shift-pinion is caused to mesh with the adjacent spool-pinion, while the other is simultaneously withdrawn from engagement with the spool-pinion at the opposite end of the carriage. When one of the shift-pinions is enmeshed with both the operating-rack and a spool-pinion, said spool-pinion will be rotated in a direction to wind the ribbon upon the contiguous spool when the carriage is advanced in the direction of letter-spacing, and hence when the carriage is fed forward step by step by the operation of the letter or space keys the ribbon will be fed to present an unused portion thereof to each succeeding type as the latter is presented to the printing-point. By reason of the pawl-and-ratchet connection between the spool-pinions and the spool-shafts the pinion which is in operation will rotate independently of the shaft during the retraction of the carriage, so that the feed of the ribbon will be automatically stopped when the retractile movement of the carriage is begun and will so remain until the carriage again moves forward in the direction of letter-spacing. Obviously as the ribbon-feeding mechanism is operated by the movement of the power-propelled carriage the latter constitutes a motor for operating said feeding mechanism. The preceding description of the ribbon supporting and feeding mechanism may be amplified by reference to the Smith patent before identified.

I shall now proceed to describe the mechanism whereby the direction of the feed of the ribbon will be automatically reversed when said ribbon has been completely wound upon one of the spools. This reversal is effected by temporarily connecting the keys of the type-writer with the shift-bar 36, so that the depression of a key to print will instantly shift the bar to reverse the direction of the ribbon-feed, and this temporary connection is effected at the proper time by mechanism which is normally held inactive by the ribbon, but which when the feed in one direction is completed will be effective to establish the connection between the keys and the shift-bar for the purpose stated.

At each end of the carriage is mounted a group of elements constituting ribbon-reversing mechanism, each group being arranged to move the shift-bar 36 in one direction. The reversing mechanism at the left-hand end of the carriage viewed from the front includes a lever 39 of the first class fulcrumed upon a bracket 40, pendent from the carriage-casing. At its lower end the lever 39 has a loose pivotal connection, as at 41, with the shift-bar 36, while the upper end of the lever, which is extended into the carriage-casing, is equipped with a locking-dog 42 and a lateral stud or projection 43. The beak 44 of the dog 42 normally extends over and engages a tooth or projection 45 at the bottom of the carriage-casing (see Figs. 1 and 4) to lock the lever against such movement as would serve to shift the bar 36. The dog 42 is yieldingly urged toward its engaging position by a spring 46 and adjacent to its free end is provided with a laterally-extending pin 47, which is engaged and lifted to withdraw the dog from the projection 45 by an unlocking-cam 48. The cam 48 is carried at the free end of a rocker-arm 49, depending from one end of a short rock-shaft 50, supported in bearing-brackets 51 and carrying at its opposite end a horizontally-disposed arm 52. In the arm 52 is a right-angular slot 53, through which extends a headed stud 54, carried at the lower end of a link 55, pivoted at its upper end to an arm 56, extending forwardly from the shaft 15. When in the operation of the type-writer the shaft 15 is rocked by the keys to operate the escapement in the manner heretofore described, the stud 53 plays idly up and down in the vertical portion 53ᵃ of the slot 53, and when thus positioned (see Fig. 4) there is no operative connection between the keys and the shift-bar. Obviously, however, if the link 55 be shifted laterally to present the stud 54 within the horizontal portion 53ᵇ of the slot 53 the subsequent depression of the arm 56 when the shaft 15 is rocked by a key will effect the depression of the arm 52, (see Fig. 7,) since an operative connection will thus be effected between the rock-shaft 50 and the shaft 15. When the arm 52 is thus depressed, the shaft 50 will be rocked to swing the arm 49, which after lifting the dog 42 will contact with the stud 43 and swing the lever 39 to shift the bar 36 and reverse the ribbon-feed. This movement of the link 55 to establish a temporary connection between the keys and the shift-bar of the ribbon-feeding mechanism is effected by a ribbon-controlled finger 57 through the medium of interposed mechanism including a rock-shaft 58, from the rear end of which extends an arm 59, connected at its upper end to the link 55 by a link 60.

From the shaft 58, journaled in bearings 58', extend a pair of arms 61, connected at their outer ends by a bar 62, said arms and the bar constituting a yoke designed to be engaged and swung by the finger 57 for the purpose of urging the arm 59 and the link 55 in the proper direction to cause the stud 54 to enter the horizontal portion 53ᵇ of the slot 53, and thus effect the temporary connection of the keys and shift-bar. In effect, the swinging yoke and the arm 59 constitute a lever of the first class; but the yoke-like form of the lower arm of this lever is necessitated by the fact that the finger 57 is carried by the ribbon-spool 26 and must be capable of engaging the bar 62, regardless of the fact that the spool is shiftable endwise of the shaft 24 in order to present different horizontal stripes or tracks of the ribbon at the printing-point. The finger 57 is disposed radially with respect to the spool 26, closely adjacent to one of the spool-flanges, and is carried at the free edge of a swinging plate 63, hinged to the spool and arranged to lie flat against the hub of the spool when the ribbon is wound thereon. In such position of the plate the arm 57 is located within the periphery of the spool; but when in course of time the ribbon is unwound from the spool the plate 63 is urged outwardly by a spring 64, so as to project the arm 57 beyond the periphery of the spool and into a path of movement obstructed by the bar 62 of the yoke. (See Fig. 1.) When the arm 57 has lifted the bar 62 and moved away from the same, the link 55 is drawn back by a spring 65 to present the stud 54 opposite the vertical portion 53ᵃ of the slot 53, and thus break the connection between the keys and the shift-bar.

At the right-hand end of the carriage (viewed from the front) is a second group of reversing mechanism very similar in construction to that just described, some modification being made necessary by the fact that instead of a second lever like the lever 39 the right-hand end of the shift-bar 36 is equipped with a rigid vertically-disposed arm 66, having its upper end extended into the carriage-casing and equipped with a locking-dog 67, urged by a spring 68 to engage a tooth or projection 69, as shown in Fig. 6, to hold the shift-bar in one position. The bar 66 is provided with an angular head 70, equipped with a laterally-disposed stud 71, and with a vertical slot 72, through which latter a pin 73 is extended from the dog 67. The pin 73 is arranged to be engaged and lifted to disengage the dog 67 by an unlocking-cam 74, carried at the lower end of a rocker-arm 75, extended from a rock-shaft 76, journaled in the bearings 77 and corresponding generally to the rock-shaft 50 at the other end of the carriage. The arm 75, however, is secured to the shaft 76 between the bearings 77 and is provided with a retracting-spring 78. At the front end of the shaft 76 is fixed a horizontal arm 79, provided with a right-angular slot 80, corresponding to the slot 53 in the arm 52 and likewise receiving a stud 81, projecting from a link 82, pendent from an arm 83, extended forwardly from the escapement-operating rock-shaft 15.

The link 82 is designed to be shifted laterally to present the stud 81 opposite the horizontal portion 80$^a$ of the slot 80 by an arm 84, connected to the link 82 by a link 85. The arm 84 extends upwardly from a rock-shaft 86, corresponding with the shaft 58 at the other end of the machine and likewise provided with a yoke comprising arms 87 and a connecting-bar 88. This yoke is arranged to be engaged and operated by a finger 89, associated with the spool 27 and corresponding in construction, operation, and mounting with the finger 57, except that said finger 89 is designed to swing the bar 88 downwardly as distinguished from the upward movement of the bar 62 by the finger 57. The retraction of the link 82 to present the stud 81 in its normal position opposite the vertical portion 80$^b$ of the slot 80 is effected by a spring 90, secured at one end to the link 82 and at its opposite end to an arm 91, projecting from the shaft 15. (See Figs. 3 and 8.)

Briefly, the operation of my automatic ribbon-reversing mechanism is as follows: Assuming the parts to be in the positions shown in Figs. 3, 4, 5, and 8, it will be noted that the ribbon is partially wound upon both spools and that both of the fingers 57 and 89 are held by the ribbon in their inactive positions. It will also be noted (see particularly Fig. 8) that the shift-pinion 34 is in engagement with the rack 32 and the spool-pinion 31 and that consequently the spool 27 is being operated (assuming the carriage to be in motion) to feed the ribbon in the direction indicated by the arrow in Fig. 8. Furthermore, (see particularly Fig. 3,) the shift-bar is held in one position by the engagement of the dog 42 with the tooth or projection 45, so that accidental reversal of the ribbon-feed is impossible. The positive operation of the reversing mechanism is of course prevented, because there is no operative connection between the keys and the shift-bar, since the studs 54 and 81 will reciprocate idly in the vertical portions of the slots 53 and 80 when the links 55 and 82 are moved vertically by the swinging of the shaft 15 under the impulse of the keys to operate the escapement. Finally, however, the ribbon will be competely wound upon the spool 27 and unwound from the spool 26, as shown in Fig. 1, and since the tension of the spring 64 is greater than the frictional resistance opposed to the movement of the spool 26, the plate 63, relieved of the enveloping convolutions of the ribbon, will swing outwardly, thus presenting the finger 57 in the position shown in Fig. 1. Continued movement of the carriage and the consequent rotation of the spool 26 will present the finger 57 to the bar 62 of the adjacent yoke, thus lifting the latter to rock the shaft 58 and effecting the shifting of the stud 54 to the horizontal portion of the slot 53. An operative connection will thus be established between the keys and the shift-bar 36, since it is evident that upon the next depression of a key the shaft 15 will be rocked, thus depressing the links 55 and 82, as shown in Fig. 7. This depression of the link 82 is ineffective, because the lug thereof will play in the vertical portion of the slot 80; but the depression of the other link 55 is effective, because its stud 54, being in the horizontal portion of the slot 53, will depress the arm 52, as shown in Fig. 7, thus rocking the shaft 50 and swinging the arm 49. The initial movement of the arm 49 causes the unlocking-cam 48 to ride under the pin 47, thus lifting the dog 42 out of engagement with the tooth 45 and unlocking the shift-bar. Continued movement of the arm 49 presents it to the stud 43 at the upper end of the lever 39, the lever being then moved to shift the bar 36 to disengage the shift-pinion 34 from the spool-pinion 31 and to engage the shift-pinion 33 with the spool-pinion 30 at the other end of the carriage, as shown in Fig. 7. This movement of the shift-bar 36 will move the dog 67 from the position shown in Fig. 1 to the position shown in Fig. 6—to wit, from the unlocked to the locked position—and said dog will then serve as locking means for the shift-bar in lieu of the dog 42, which is now in an unlocked position, as also shown in Fig. 7. The positions of the parts having been reversed in the manner stated, the shifting of the escapement permitted by the release of the key will permit the carriage to be drawn to the right, and during such movement the spool 26 will be positively operated in a direction to wind the ribbon thereon instead of on the spool 27, as before. As the finger 57 moves with the spool 26 it will recede from the bar 62, thus permitting the latter to drop and to swing the link 55 back to its normal position, as shown in Fig. 4, presenting the stud 54 to the vertical portion of the slot 53 and breaking the connection between the keys and the shift-bar. The keys may now be operated without effecting the ribbon-reversing mechanism, and before the finger 57 again arrives at a point where it might contact with the adjacent yoke it will have been drawn inward toward the axis of the ribbon-spool by the winding of the ribbon upon the latter. The ribbon will now continue to advance from the spool 27 to the spool 26 during the step-by-step advance of the carriage in the direction of letter-spacing until finally, the ribbon being completely unwound from the spool 27, the reversing mechanism located at the right-hand end of the carriage will operate to effect a reversal of the ribbon-feed in a manner substantially similar to the described operation of that group of mechanism located at the left-hand end of the carriage. In other words, the unwinding of the ribbon from the spool 27 will permit the finger 89 to move out, so that as the spool 27 continues to rotate the finger will strike and depress the bar 88, thus rocking the shaft 86 and causing the stud 81 on the link 82 to be shifted to the horizontal portion of the slot 80 in the arm 79. The depression of a key will then rock the shaft 15, causing a depression of the link 82 and the swinging of the arm 75. As the arm swings it first presents the unlocking-cam 74 to the end of the pin 72, releasing the dog 67 from the tooth 69, and subsequently engages the stud 71 to shift the bar 36 back to the position shown in Figs. 1, 3, and 8, the lever 39, connected to the bar, being incidentally swung to cause the dog 42 to again engage the tooth 45.

Thus it will be seen that the ribbon-reversing mechanism comprehends a shifter or shift-bar movable to reverse the ribbon-feed, two locking devices which lock the shift-bar in its respective positions, two unlocking and shifting mechanisms each arranged to unlock and shift the bar, and two mechanisms each operated by a ribbon-controlled element to effect a temporary connection between the keys of the type-writer and one of the unlocking and shifting mechanisms.

It is thought that from the foregoing the construction and operation of the described mechanism will be clearly understood. It should be distinctly understood, however, that I reserve the right to effect such changes or variations of the illustrated structure as may be suggested by experience and experiment or necessary to the equipment of different types of machines, provided only that such variations from the construction shown be fairly embraced within the scope of the appended claims.

What I claim is—

1. In a type-writing machine, the combination with the movable carriage, and keys, of ribbon-feeding mechanism operated by the movement of the carriage, and ribbon-feed-reversing mechanism operated by the keys.

2. In a type-writing machine, the combination with a frame, a movable carriage, and keys, of ribbon-feeding mechanism mounted on the carriage and operated by the movement thereof, and ribbon-feed-reversing mechanism operated by the keys.

3. In a type-writing machine, the combination with a movable carriage, and keys, of ribbon-feeding mechanism operated by the movement of the carriage, ribbon-reversing mechanism, and means for automatically connecting the ribbon-reversing mechanism with the keys to effect the reversal of the ribbon-feed at the proper time.

4. In a type-writing machine, the combination with a movable carriage, and keys, of ribbon-feeding mechanism mounted on the carriage and operated by the movement thereof, and ribbon-reversing mechanism also mounted on the carriage and operated by the keys.

5. In a type-writing machine, the combination with a movable carriage and ribbon-feeding mechanism mounted on and operated by the movement of the carriage, of the type-writer keys, ribbon-reversing mechanism normally disconnected from the keys, and ribbon-controlled means for connecting the keys with the ribbon-reversing mechanism during the travel of the carriage from one printing position to another, whereby the key next depressed will operate the ribbon-feed-reversing mechanism to reverse the direction of the ribbon-feed.

6. In a type-writing machine, the combination with the carriage, ribbon-spools movable therewith, a relatively fixed rack, and gearing arranged to gear either of the spools to the rack to effect the positive rotation of one spool or the other as the carriage advances, of ribbon-feed-reversing mechanism arranged to shift the gearing to disconnect one ribbon-spool from the rack and to gear the other spool to said rack, the usual type-writer keys normally disconnected from the ribbon-feed-reversing mechanism, a device movable to effect an operative connection between the keys and the ribbon-feed-reversing mechanism, and a member movable with a ribbon-spool to operate said connecting device, said member being normally retained in an inactive position by the ribbon wound upon the spool.

7. In a type-writing machine, the combination with the carriage and keys, of a pair of ribbon-spools movable with the carriage, spool-pinions for the spools, a relatively fixed rack, a shift-bar, a pair of shift-pinions carried by the bar and engaging the rack, ribbon-feed-reversing mechanism arranged to shift the shift-bar to present one of the shift-pinions to a spool-pinion, and ribbon-controlled means for automatically connecting the ribbon-feed-reversing mechanism with the keys for actuation by the latter.

8. In a type-writing machine, the combination with the keys and the escapement operated thereby, of a motor, ribbon-feeding mechanism operated by the motor and controlled by the escapement, ribbon-feed-reversing mechanism normally disconnected from the keys, and ribbon-controlled means for effecting a temporary connection between the ribbon-feed-reversing mechanism and the keys, whereby the operation of the latter will effect a reversal of the ribbon-feed.

9. In a type-writing machine, the combination with a movable carriage, an escapement controlling the movement thereof, ribbon-feeding mechanism operated by the movement of the carriage and thus controlled by the escapement, a member for operating the escapement, keys having permanent operative connection with the member to operate the same and thus shift the escapement when a key is depressed to print a character, ribbon-feed-reversing mechanism normally disconnected from the escapement-operating member, and means for automatically connecting said member with the ribbon-feed-reversing mechanism to operate the latter.

10. In a type-writing machine, the combination with a carriage, an escapement controlling its movement, an escapement-operating member, and keys for moving the member, of ribbon-feeding mechanism, ribbon-feed-reversing mechanism, a connecting device carried by the escapement-operating member and movable into effective engagement with the ribbon-reversing mechanism, and ribbon-controlled means for moving the connecting device.

11. In a type-writing machine, the combination with the carriage, keys, and ribbon-feeding mechanism, of ribbon-reversing mechanism including a lever having an angular slot in one arm thereof, and mechanism for connecting said lever with the keys for actuation by the latter, said mechanism including a connecting device playing idly in one portion of the slot and movable to another portion of the slot to operatively connect the lever and keys.

12. In a type-writing machine, the combination with the carriage, escapement, and keys, of a rock-shaft operated by the keys and serving to actuate the escapement, ribbon-feeding mechanism, ribbon-reversing mechanism, and a connecting member movable with the rock-shaft as the latter is operated by the keys and also movable in another direction into and out of effective engagement with the ribbon-reversing mechanism.

13. In a type-writing machine, the combination with the carriage, escapement, and keys, of a rock-shaft operated by the keys and disposed to operate the escapement, ribbon-feeding mechanism, ribbon-feed-reversing mechanism including a lever, and a link movable with the rock-shaft and arranged to swing into and out of effective engagement with the lever.

14. In a type-writing machine, the combination with the carriage, escapement, and keys, of a key-operated rock-shaft arranged to operate the escapement, ribbon-feeding mechanism operated by the movement of the carriage and including a shifter movable to reverse the ribbon-feed, ribbon-feed-reversing mechanism including a lever for moving the shifter, a link reciprocated by the rock-shaft when the latter is moved to operate the escapement, and ribbon-controlled means for swinging the link into effective engagement with the lever of the ribbon-feed-reversing mechanism.

15. In a type-writing machine, the combination with the carriage, its escapement, and an escapement-operating member, of ribbon supporting and feeding mechanism including a pair of ribbon-spools, means for positively rotating either spool, and a shifter, ribbon-feed-reversing mechanism including a lever for moving the shifter, a connecting device carried by the escapement-operating member and movable into effective engagement with the lever, a second lever for moving the connecting device to its engaging position, and a finger movable with a spool to operate the last-named lever, said finger being normally held in an inoperative position by the ribbon wound upon the spool.

16. In a type-writing machine, the combination with the carriage, keys, ribbon-feeding mechanism, and ribbon-feed-reversing mechanism, of a key-operated locking device for the ribbon-feed-reversing mechanism.

17. In a type-writing machine, the combination with a carriage, keys, and ribbon-feeding mechanism including an element movable to reverse the direction of the ribbon-feed, of a key-operated locking device for said element.

18. In a type-writing machine, the combination with a carriage, keys, and ribbon-feeding mechanism including an element movable to reverse the direction of the ribbon-feed, of a locking device for said element normally disconnected from the keys, and means for effecting a temporary connection between the keys and the locking device.

19. In a type-writing machine, the combination with a carriage, keys, and ribbon-feeding mechanism including an element movable to reverse the direction of the ribbon-feed, of a locking device for said element, and means for automatically connecting the locking device with the keys.

20. In a type-writing machine, the combination with a carriage, keys, and ribbon-feeding mechanism including an element movable to reverse the direction of the ribbon-feed, of a locking device for said element, and ribbon-controlled means for effecting a temporary connection between the keys and the locking device.

21. In a type-writing machine, the combination with the carriage, keys, and ribbon-feeding mechanism including a shifter, of a pivoted locking-dog having operative connection with the shifter and engaging a fixed part, and means for disengaging the dog from the fixed part to release the shifter.

22. In a type-writing machine, the combination with the carriage, keys, and ribbon-feeding mechanism including a shifter, of a locking device for the shifter, and means operated by the keys for operating the locking device and the shifter.

23. In a type-writing machine, the combination with a carriage, keys, and ribbon-feeding mechanism including a shifter, of a locking device for the shifter, a member movable to operate the locking device to release the shifter and also movable to actuate the shifter, and means for connecting said member with the keys for actuation thereby.

24. In a type-writing machine, the combination with a carriage, keys, and ribbon-feeding mechanism including a shifter, of a locking device for the shifter, and ribbon-controlled means for effecting a temporary connection between the keys and the locking device and shifter, whereby the depression of a key will move the locking device to release the shifter and will thereafter operate the shifter to reverse the direction of the ribbon-feed.

25. In a type-writing machine, the combination with a carriage, keys, and ribbon-feeding mechanism including a shifter movable to change the direction of the ribbon-feed, of a locking device for the shifter, a lever movable to release and move the shifter, and ribbon-controlled means for automatically connecting the lever to the keys for actuation by the latter.

26. In a type-writing machine, the combination with a carriage, keys, and ribbon-feeding mechanism including a shifter movable to reverse the direction of the ribbon-feed, of a lock for the shifter, an escapement controlling the movement of the carriage, an escapement-operating member arranged to be operated by the keys, a lever movable to unlock and move the shifter, said lever being normally disconnected from the escapement operating member, and means for automatically establishing a temporary connection between the escapement-operating member and the lever.

27. In a type-writing machine, the combination with a carriage, keys, and ribbon-feeding mechanism including a shifter movable to reverse the direction of the ribbon-feed, of a lock for the shifter, an escapement controlling the movement of the carriage, an escapement-operating member arranged to be operated by the keys, a lever movable to unlock and move the shifter, said lever being normally disconnected from the escapement-operating member, and ribbon-controlled means for effecting an operative connection between the escapement-controlled member and the lever.

28. In a type-writing machine, the combination with a carriage, keys, and ribbon-feeding mechanism including a shifter movable to reverse the direction of the ribbon-feed, of a lock for the shifter, an escapement controlling the movement of the carriage, an escapement-operating member arranged to be operated by the keys, a lever movable to unlock and move the shifter, said lever being normally disconnected from the escapement-operating member, a swinging link carried by the escapement-operating member, and means for moving said link into effective engagement with the lever.

29. In a type-writing machine, the combination with a carriage, keys, and ribbon-feeding mechanism including a shifter movable to reverse the direction of the ribbon-feed, of a pair of locking devices for said shifter, and means for operatively connecting the keys with the locking devices in alternation.

30. In a type-writing machine, the combination with a carriage, keys, and ribbon-feeding mechanism including a shifter, of a pair of locking devices for the shifter, a pair of ribbon-feed reversing mechanisms each arranged to move one of the locking devices of the shifter, and ribbon-controlled means for alternately connecting the ribbon-reversing mechanisms with the keys for actuation thereby.

31. In a type-writer, the combination with a carriage, escapement and keys, of a key-operated member arranged to operate the escapement, ribbon-feeding mechanism including a shifter movable to reverse the ribbon-feed, ribbon-feed-reversing mechanism including a lever for moving the shifter, a link reciprocated by the escapement-operated member when the latter is moved to operate the escapement, and ribbon-controlled means for swinging the link into effective engagement with the lever of the ribbon-feed-reversing mechanism.

32. In a type-writing machine, the combination with a movable carriage, a key and ribbon-feeding mechanism operated by the movement of the carriage, of means operated by the key for reversing the feed of the ribbon.

33. In a type-writing machine, the combination with printing mechanism and a ribbon, of a motor for feeding the ribbon relative to the printing mechanism, a key, and means operated by the key for effecting the reversal of the ribbon-feed.

34. In a type-writing machine, the combination with printing mechanism and an ink-ribbon, of a motor for feeding the ribbon relative to the printing mechanism, a key, ribbon-feed-reversing mechanism, and automatic means for effecting a temporary connection between the key and the ribbon-reversing mechanism.

35. In a type-writing machine, the combination with printing mechanism and an ink-ribbon, of a motor for feeding the ribbon relative to the printing mechanism, keys for operating the printing mechanism, and ribbon-feed-reversing mechanism operated by said keys.

36. In a type-writing machine, the combination with printing mechanism, operating-keys therefor, and an ink-ribbon, of a motor for feeding the ink-ribbon relative to the printing mechanism, ribbon-feed-reversing mechanism, and means whereby the keys will be automatically connected with the ribbon-feed-reversing mechanism to operate the latter when the feed of the ribbon in one direction is completed.

37. In a type-writing machine, a movable carriage, printing mechanism and a key, of a ribbon, ribbon-feeding mechanism operated by the movement of the carriage, ribbon-feed-reversing mechanism normally disconnected from the key, and means for temporarily connecting the key with the ribbon-feed-reversing mechanism.

38. In a type-writing machine, a movable carriage, printing mechanism and a key, of a ribbon, ribbon-feeding mechanism operated by the movement of the carriage, ribbon-feed-reversing mechanism normally disconnected from the key, and automatic means for temporarily connecting the key with the ribbon-feed-reversing mechanism.

39. In a type-writing machine, a movable carriage, printing mechanism and a key, of a ribbon, ribbon-feeding mechanism operated by the movement of the carriage, ribbon-feed-reversing mechanism normally disconnected from the key, and ribbon-controlled means for temporarily connecting the key with the ribbon-feed-reversing mechanism.

In testimony that I claim the foregoing as my own I have hereto affixed my signature in the presence of two witnesses.

WILLIAM A. TWINING.

Witnesses:
W. T. McELROY,
ARTHUR COWDREY.